(12) United States Patent
Kuppahally et al.

(10) Patent No.: US 11,250,022 B1
(45) Date of Patent: Feb. 15, 2022

(54) OFFLINE INDEX BUILDS FOR DATABASE TABLES

(71) Applicant: Amazon Technologies, Inc., Seattle, WA (US)

(72) Inventors: Sharatkumar Nagesh Kuppahally, Issaquah, WA (US); Peter Zhivkov, Seattle, WA (US); Somasundaram Perianayagam, Seattle, WA (US); James Christopher Sorenson, III, Seattle, WA (US); Amit Gupta, Redmond, WA (US); Chase Kernan, Seattle, WA (US); Nicholas Gordon, Seattle, WA (US); Ravi Math, Redmond, WA (US); Vaibhav Jain, Karnataka (IN); Remi Paucher, Dublin (IE)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/037,482

(22) Filed: Sep. 29, 2020

(51) Int. Cl.
*G06F 16/27* (2019.01)
*G06F 16/22* (2019.01)

(52) U.S. Cl.
CPC .......... *G06F 16/27* (2019.01); *G06F 16/2282* (2019.01)

(58) Field of Classification Search
USPC ........................................................ 707/624
See application file for complete search history.

(56) References Cited

U.S. PATENT DOCUMENTS

| | | | |
|---|---|---|---|
| 10,423,493 B1* | 9/2019 | Vig | G06F 16/2322 |
| 11,068,461 B1* | 7/2021 | Chan | G06F 16/26 |
| 2016/0147859 A1* | 5/2016 | Lee | G06F 11/1469 |
| | | | 707/615 |
| 2016/0306709 A1* | 10/2016 | Shaull | G06F 11/1458 |
| 2017/0371914 A1* | 12/2017 | Bourbonnais | G06F 16/27 |
| 2018/0322157 A1* | 11/2018 | Lee | H04L 67/1095 |

* cited by examiner

*Primary Examiner* — Muluemebet Gurmu
(74) *Attorney, Agent, or Firm* — Robert C. Kowert; Kowert, Hood, Munyon, Rankin & Goetzel, P.C.

(57) ABSTRACT

Offline building of a projected data subset may be performed. A request to create a data set that is a projected subset of data from a source data set may be received. A data store separate from the data store storing the source data set may store a copy of the source data set that is used to replicate items to the projected subset of data according to a schema for the projected data subset. Updates made to the source data set may also be replicated to the projected data subset according to the schema. Conflicts between replicated items and replicated updates to the projected data set may be resolved by comparing a version identifier for the replicated update and replicated item to determine what to store in the projected data subset.

20 Claims, 8 Drawing Sheets

OFFLINE INDEX BUILDS FOR DATABASE TABLES

BACKGROUND

Data is often distributed to scale the storage capacity or processing capacity of systems that provide access to the data. For example, database tables or other data objects can be divided into partitions in order to leverage the capacity of different hosts, such as different servers or other computing devices, to separately provide access to individual partitions. Replicating different portions of the partitioned data can further increase the complexity and costs of propagating changes to the data to other data replicas. For example, projections or views of a partitioned database table may be separately maintained. Propagating changes to the projection or views may increase the costs of processing updates at the original partitions of the database table as the original partitions of the database table may need to ensure that the appropriate projections or views of the database table are updated. Techniques that can provide scalable mechanisms for replicating updates to replicated data are thus highly desirable.

Figure 1:
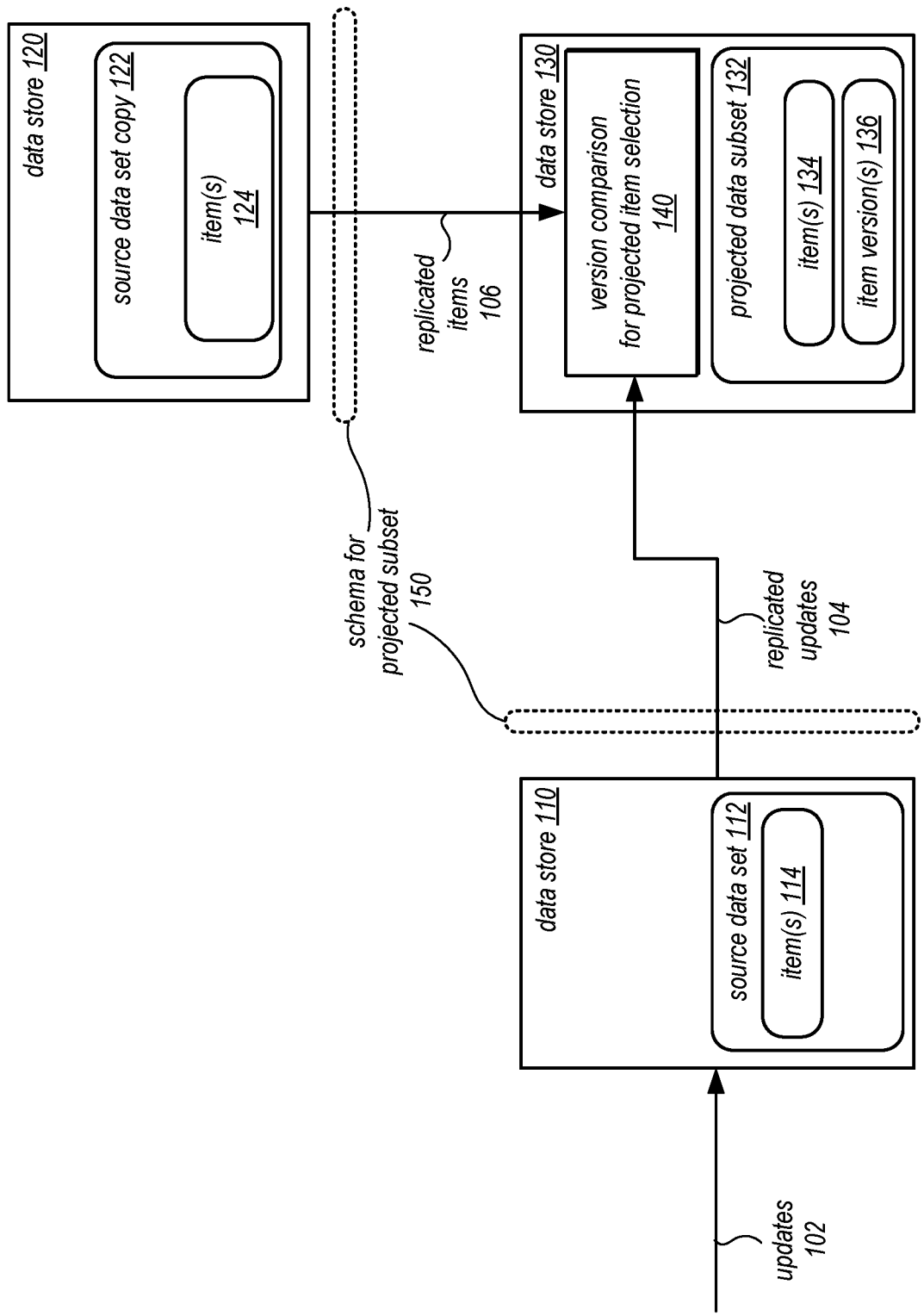
FIG. 1 is a logical block diagram illustrating offline index builds for database tables, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The techniques described herein may implement offline index builds for database tables. Data sets may be distributed across one or more locations in a storage system, in some embodiments. In this way, clients can access and independently update different portions of the data set at the one or more locations in the storage system, in some embodiments. The arrangement of the data set may be optimal for some access requests (e.g., queries based on indexed fields or values in a table). However, to optimally process other access requests (e.g., queries based on non-indexed fields or values in a table), portions of the data set (or the entire data set) may be replicated in one or more other locations (e.g., a different storage nodes, systems, or hosts) in a different arrangement, subset, or format that is more performant for performing the other type of access request, in some embodiments.

Instead of relying upon the resources of a source storage location for a data set to create new a new replica of a data set, such as a projected data subset like a secondary index as discussed below, offline techniques that index or otherwise determine which portions of a source data set to replicate to the new replica using other resources, such as a separate system component or node, may be implemented. In this way, a majority of data that has to be replicated to the new replica can replicated away from the source storage location, reducing the burden of transferring data on source storage location resources (e.g., storage nodes as discussed below) to perform other operations, such as client application requests to read or write to the data set. Additionally, offline techniques may reduce the state and/or other tracking information that is maintained by source storage location resources. Offline techniques may also reduce the complexity of failures at source storage location resources and provide support for optimizations that increase the performance of creating the replica of the data by allowing for parallel creation techniques, among others.

FIG. 1 is a logical block diagram illustrating offline index builds for database tables, according to some embodiments. Source data set 112 may be a database table (or tables), or other set, collection, or grouping of data item(s) 114 that may be also stored in a second location, such as data store 130, as projected data subset 132. For example, as discussed in detail below with regard to FIGS. 2-5, source data set 112 may be one or more database tables and projected data subset 152 may be a secondary index. Updates 102 may accepted and performed at data store 110 that are directed to source data set 112, which may be various types of actions, modifications, or changes to source data set 112 (e.g., insert new item(s) (or attributes of items), modify item(s), delete items (or attributes of items)). These updates may be performed in some ordering at data store 110. For example, updates 102 may be performed in a FIFO ordering where each update is performed as it is received.

To create a new replica of a source data set, an "offline" copy of source data set 112 may be used. For example, data store 120 may be another data storage system (or set of resources) which may store source data set copy 122, including item(s) 124. In at least some embodiments, source data set copy 122 may be a snapshot or other version of source data set 112 associated with a particular point in time (e.g., the time at which the copy 122 is created). Thus, item(s) 124 may or may not be consistent with item(s) 114 (e.g., including additional or fewer items). Source data set copy 122 may be used to create projected data subset 132 by evaluating item(s) 124 according to schema 150 to replicate those items 106 that are specified by or otherwise satisfy the schema. For example, items with certain attribute values may be replicated (e.g., a location attribute) that are specified by a schema (e.g., a secondary index that orders item(s) 114 by location instead of by customer identifier) whereas other attribute values (or items) may not be replicated (e.g., items with a particularly specified location attribute, such as a postal code, may be replicated whereas items with different postal codes may not be replicated). The replicated items 116 may sent, written, or otherwise stored to data store 130 for inclusion in projected data subset 132. In this way, in scenarios where a large projected data subset 132 is created, a large majority of data can be replicated from data store 120 (which may not be "online" and accepting/performing access requests to source data set copy 122, unlike data store 110 which may be accepting access requests to source data set 112, such as updates 102).

In order to keep projected data subset 132 consistent with a source data set 112, some of updates 102 may be replicated to data store 130 to update projected data subset 132 according to schema 150 for the projected data subset 132. For example, as noted above items with certain attribute values may be replicated (e.g., a location attribute) that are specified by a schema whereas other attribute values (or items) may not be replicated. Thus, only some updates 102 may be replicated in some scenarios (though all or none of received updates may be replicated according to whether the schema 150 for the projected data subset 132 includes the items affected by the updates).

Version comparison for projected item selection 140 may handle conflicts from replicated updates 104 and the replicated items 106 from "offline" copy of source data set 122 with items 124. For example, a timestamp, sequence number or other value may be assigned to replicated updates 104 and replicated items 106 when received (e.g., at data store 110) and created (e.g., at data store 120, such as when source data set copy 122 was created), when determined to be propagated or using some other assignment technique. Such values may be a version for the update which may be used in a condition supplied by the conditional operation to data store 130. If the condition is satisfied, then the operation may be performed. For instance, a replicated item 106 could conflict with a replicated update 104 to that same item. If the replicated item 106 were received after the replicated update 104 for the item, the older version of replicated item 106 could potentially overwrite a newer version of the item described in replicated update 104 if not for the version comparison 140 performed at data store 130.

Atomicity of conditional operations may, in some embodiments, prevent a different request or operation from modifying a condition evaluated to be satisfied (or not) (e.g., by modifying an item version 156) between when the condition is evaluated and the update is applied as part of the conditional operation. Thus, if an update has a version condition that to be satisfied must be a version later than a version associated with an item to which the update is applied, that condition check can prevent out of order updates with respect to replicated items 106 (or other updates) from overwriting or otherwise becoming visible to client applications that access projected data subset 132. For example, item version(s) 136 may be stored as system attributes or values, in some embodiments, which are not visible to client applications of data store 130. Instead, conditional operations received as part of propagation may utilize the item version(s) 136 as the value to which update versions are compared.

Please note that previous descriptions of a data store, data set, and conditional propagation are not intended to be limiting, but are merely provided as logical examples.

This specification begins with a general description of a provider network that may implement a database service that may implement offline index build. Then various examples of a database service are discussed, including different components/modules, or arrangements of components/module, that may be employed as part of implementing the database service, in some embodiments. A number of different methods and techniques to implement offline index build for databases are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
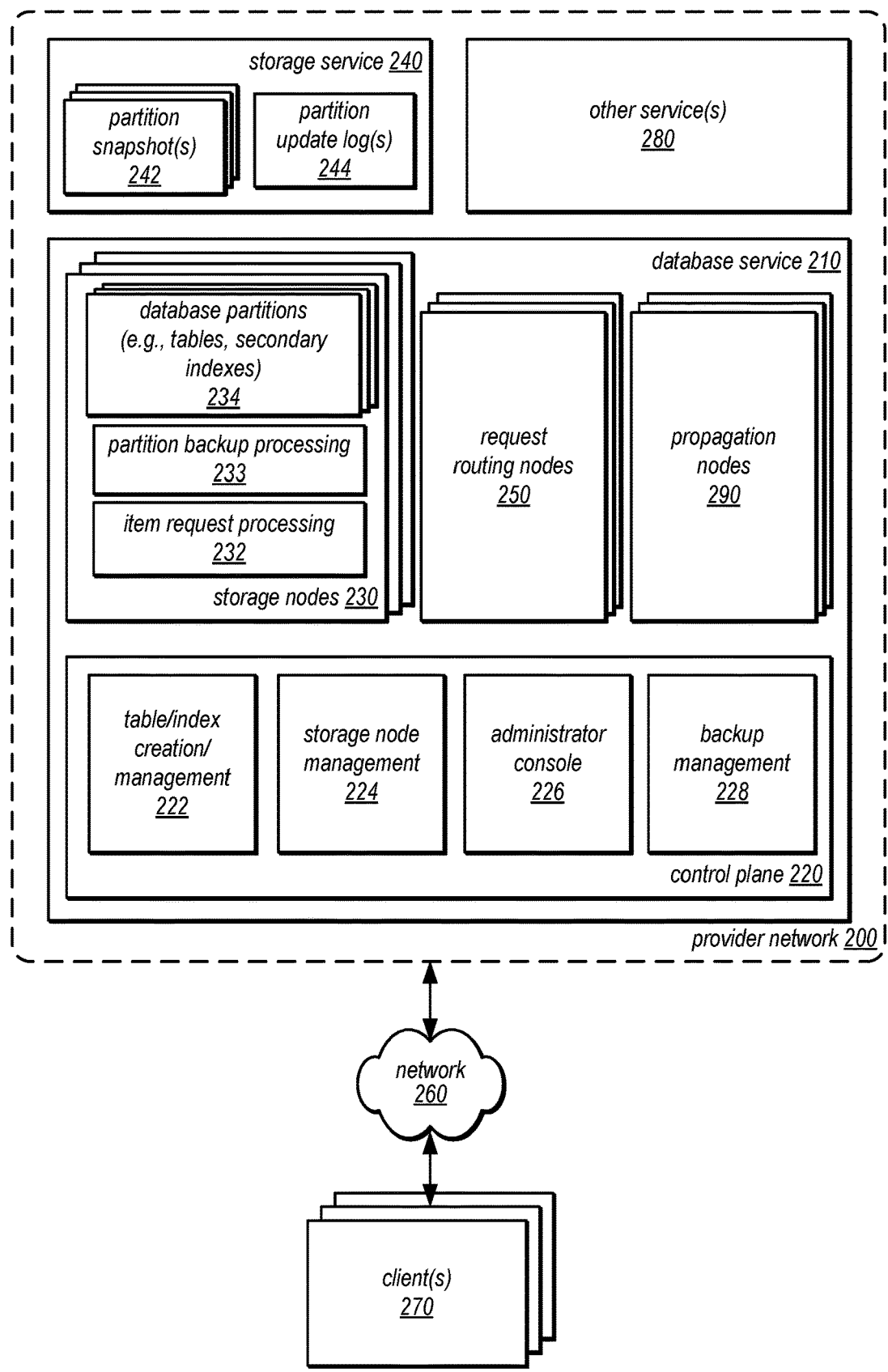
FIG. 2 is a logical block diagram illustrating a provider network offering a database service that may implement offline index builds for database tables, according to some embodiments.

FIG. 2 is a logical block diagram illustrating a provider network offering a database service that may implement offline index builds for database tables, according to some embodiments. Provider network 200 may be a private or closed system, in some embodiments, or may be set up by an entity such as a company or a public sector organization to provide one or more services (such as various types of cloud-based storage) accessible via the Internet and/or other networks to clients 270, in another embodiment. In some embodiments, provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and storage services offered by the provider network 200. In some embodiments, provider network 200 may implement various computing resources or services, such as database service 210 (e.g., a non-relational (NoSQL) database, relational database service or other database service that may utilize collections of items (e.g., tables that include items)), and other services (not illustrated), such as data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in some embodiments, each of which may be similar to the computer system embodiment illustrated in FIG. 8 and described below. In some embodiments, the functionality of a given system or service component (e.g., a component of database service 210) may be implemented by a particular node or may be distributed across several nodes. In some embodiments, a given node may implement the functionality of more than one service system component (e.g., more than one data store component).

Database service 210 may implement various types of distributed database services, in some embodiments, for storing, accessing, and updating data in tables hosted in key-value database. Such services may be enterprise-class database systems that are highly scalable and extensible. In some embodiments, access requests (e.g., requests to get/obtain items, put/insert items, delete items, update or modify items, scan multiple items) may be directed to a table in database service 210 that is distributed across multiple physical resources, and the database system may be scaled up or down on an as needed basis. In some embodiments, clients/subscribers may submit requests in a number of ways, e.g., interactively via graphical user interface (e.g., a console) or a programmatic interface to the database system. In some embodiments, database service 210 may provide a RESTful programmatic interface in order to submit access requests (e.g., to get, insert, delete, or scan data). In some embodiments, a query language (e.g., Structured Query Language (SQL) may be used to specify access requests.

In some embodiments, clients 270 may encompass any type of client configurable to submit network-based requests to provider network 200 via network 260, including requests for database service 210 (e.g., to access item(s) in a table or secondary index in database service 210). For example, in some embodiments a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in database service 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in some embodiments. In some embodiments, client 270 may generate network-based services requests according to a Representational State Transfer (REST)-style network-based services architecture, a document- or message-based network-based services architecture, or another suitable network-based services architecture. Note that in some embodiments, clients of database service 210 may be implemented within provider network 200 (e.g., applications hosted on a virtual compute service).

In some embodiments, clients of database service 210 may be implemented on resources within provider network 200 (not illustrated). For example, a client application may be hosted on a virtual machine or other computing resources implemented as part of another provider network service that may send access requests to database service 210 via an internal network (not illustrated).

In some embodiments, a client 270 may provide access to provider network 200 to other applications in a manner that is transparent to those applications. For example, client 270 may integrate with a database on database service 210. In such an embodiment, applications may not need to be modified to make use of a service model that utilizes database service 210. Instead, the details of interfacing to the database service 210 may be coordinated by client 270.

Client(s) 270 may convey network-based services requests to and receive responses from provider network 200 via network 260, in some embodiments. In some embodiments, network 260 may encompass any suitable combination of networking hardware and protocols necessary to establish network-based-based communications between clients 270 and provider network 200. For example, network 260 may encompass the various telecommunications networks and service providers that collectively implement the Internet. In some embodiments, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in some embodiments, client(s) 270 may communicate with provider network 200 using a private network rather than the public Internet.

Database service 210 may implement request routing nodes 250, in some embodiments. Request routing nodes 250 may receive and parse client access requests, in various embodiments in order to determine various features of the request, to parse, authenticate, throttle and/or dispatch access requests, among other things, in some embodiments. Database service 210 may implement propagation nodes 290, discussed in detail below with regard to FIGS. 3-5, which may handle propagation sessions with storage nodes, manage hot partitions, retry logic, checkpointing, and various other operations to implement propagation of updates to a secondary index.

In some embodiments, database service 210 may implement control plane 220 to implement one or more administrative components, such as automated admin instances or nodes (which may provide a variety of visibility and/or control functions). In various embodiments, control plane 220 may direct the performance of different types of control plane operations among the nodes, systems, or devices implementing database service 210, in some embodiments. Control plane 220 may provide visibility and control to system administrators via administrator console 226, in some embodiment. Administrator console 226 may allow system administrators to interact directly with database service 210 (and/or the underlying system). In some embodiments, the administrator console 226 may be the primary point of visibility and control for database service 210 (e.g., for configuration or reconfiguration by system administrators). For example, the administrator console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup or other management operations for a table, at database service 210, in some embodiments.

Storage node management 224 may provide resource allocation, in some embodiments, for storing additional data in table submitted to database service 210. For instance, control plane 220 may communicate with processing nodes to initiate the performance of various control plane operations, such as moves of table partitions, splits of table partitions, update tables, delete tables, create secondary indexes, etc. . . . In some embodiments, control plane 220 may include a node recovery feature or component that handles failure events for storage nodes 230, propagation nodes 290 and request routing nodes 250 (e.g., adding new nodes, removing failing or underperforming nodes, deactivating or decommissioning underutilized nodes, etc).

Various durability, resiliency, control, or other operations may be directed by control plane 220. For example, storage node management 224 may detect split, copy, or move events for partitions at storage nodes in order to ensure that the storage nodes maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance. In some embodiments, storage node management 224 may perform partition moves using a physical copying mechanism (e.g., a physical file system mechanism, such as a file copy mechanism) that copies an entire partition from one machine to another, rather than copying a snapshot of the partition data row by. While the partition is being copied, write operations targeting the partition may be logged. During the copy operation, any logged write operations may be applied to the partition by a catch-up process at periodic intervals (e.g., at a series of checkpoints). Once the entire partition has been copied to the destination machine, any remaining logged write operations (i.e. any write operations performed since the last checkpoint) may be performed on the destination partition by a final catch-up process. Therefore, the data in the destination partition may be consistent following the completion of the partition move, in some embodiments. In this way, storage node management 224 can move partitions amongst storage nodes 230 while the partitions being moved are still "live" and able to accept access requests.

In some embodiments, the partition moving process described above may be employed in partition splitting operations by storage node management 224 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

In some embodiments, each database partition 234 may be identified by a partition ID, which may be a unique number (e.g., a GUID) assigned at the time the partition is created. A partition 234 may also have a version number that is incremented each time the partition goes through a reconfiguration (e.g., in response to adding or removing replicas, but not necessarily in response to a master failover). When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by storage node management 224 in various ways. For example, partition size and heat, where heat may be tracked by internally measured metrics (such as IOPS), externally measured metrics (such as latency), and/or other factors may be evaluated with respect to various performance thresholds.

System anomalies may also trigger split or move events (e.g., network partitions that disrupt communications between replicas of a partition in a replica group, in some embodiments. Storage node management 224 may detect storage node failures, or provide other anomaly control, in some embodiments. If the partition replica hosted on the storage node on which a fault or failure was detected was the master for its replica group, a new master may be elected for the replica group (e.g., from amongst remaining storage nodes in the replica group). Storage node management 224 may initiate creation of a replacement partition replica while the source partition replica is live (i.e. while one or more of the replicas of the partition continue to accept and service requests directed to the partition), in some embodiments. In various embodiments, the partition replica on the faulty storage node may be used as the source partition replica, or another replica for same partition (on a working machine) may be used as the source partition replica, e.g., depending type and/or severity of the detected fault.

Control plane 220 may implement table/index creation and management 222 to manage the creation (or deletion) of database tables and/or secondary indexes hosed in database service 210, in some embodiments. For example, a request to create a secondary index may be submitted via administrator console 226 (or other database service 210 interface) which may initiate performance of a workflow to generate appropriate system metadata (e.g., a table identifier that is unique with respect to all other tables in database service 210, secondary index performance or configuration parameters, and/or various other operations for creating a secondary index as discussed below). Backup management 228 may handle or manage the creation of backup requests to make copies as of a version or point-in-time of a database, as backup partitions 242 in storage service 240, which as discussed above with regard to FIG. 1 and below with regard to FIGS. 3-7 may be used to perform an offline build of a replicated data set like a secondary index.

In some embodiments, database service 210 may also implement a plurality of storage nodes 230, each of which may manage one or more partitions of a database table or secondary index on behalf of clients/users or on behalf of database service 210 which may be stored in database storage 234 (on storage devices attached to storage nodes 230 or in network storage accessible to storage nodes 230).

Storage nodes 230 may implement item request processing 232, in some embodiments. Item request processing 232 may perform various operations (e.g., read/get, write/update/modify/change, insert/add, or delete/remove) to access individual items stored in tables in database service 210, in some embodiments. In some embodiments, item request processing 232 may support operations performed as part of a transaction, including techniques such as locking items in a transaction and/or ordering requests to operate on an item as part of transaction along with other requests according to timestamps (e.g., timestamp ordering) so that storage nodes

230 can accept or reject the transaction-related requests. In some embodiments, item request processing 232 may maintain database partitions 234 according to a database model (e.g., a non-relational, NoSQL, or other key-value database model). In some embodiments, item request processing 232 may perform operations to update, store, and/or send an update replication log to propagation node(s) 290, as discussed below with regard to FIG. 3.

In some embodiments, database service 210 may provide functionality for creating, accessing, and/or managing tables or secondary indexes at nodes within a multi-tenant environment. For example, database partitions 234 may store table item(s) from multiple tables, indexes, or other data stored on behalf of different clients, applications, users, accounts or non-related entities, in some embodiments.

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of particular portion of data (e.g., a partition) for the database service 210, as discussed below with regard to FIG. 3. Moreover, different replica groups may utilize overlapping nodes, where a storage node 230 may be a member of multiple replica groups, maintaining replicas for each of those groups whose other storage node 230 members differ from the other replica groups.

Different models, schemas or formats for storing data for database tables in database service 210 may be implemented, in some embodiments. For example, in some embodiments, non-relational, NoSQL, semi-structured, or other key-value data formats may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more name-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s) and version attributes, in some embodiments. In some embodiments, the tables maintained by the database service 210 (and the underlying storage system) may have no pre-defined schema other than their reliance on the primary key.

Metadata or other system data for tables may also be stored as part of database partitions using similar partitioning schemes and using similar indexes, in some embodiments.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes, and/or describe tables or secondary indexes, and create and/or associate functions with tables. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as requests for individual items or for multiple items in one or more tables table, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Storage service 240 may be file, object-based, or other type of storage service that may be used to store partition snapshots 242 as backups. Storage service 240 may implement striping, sharding, or other data distribution techniques so that different portions of a partition backup 242 are stored across multiple locations (e.g., at separate nodes). In various embodiments, storage nodes 230 may implement partition backup processing 233 to store partition snapshots 242 (e.g., by storing a copy of a partition 234 as of a point-in-time as a snapshot object 242 in storage service 240. In at least some embodiments, update logs 244 (e.g., created by updates for database partitions 234 by item request processing 232) may be stored as objects in storage service 240.

Figure 3:
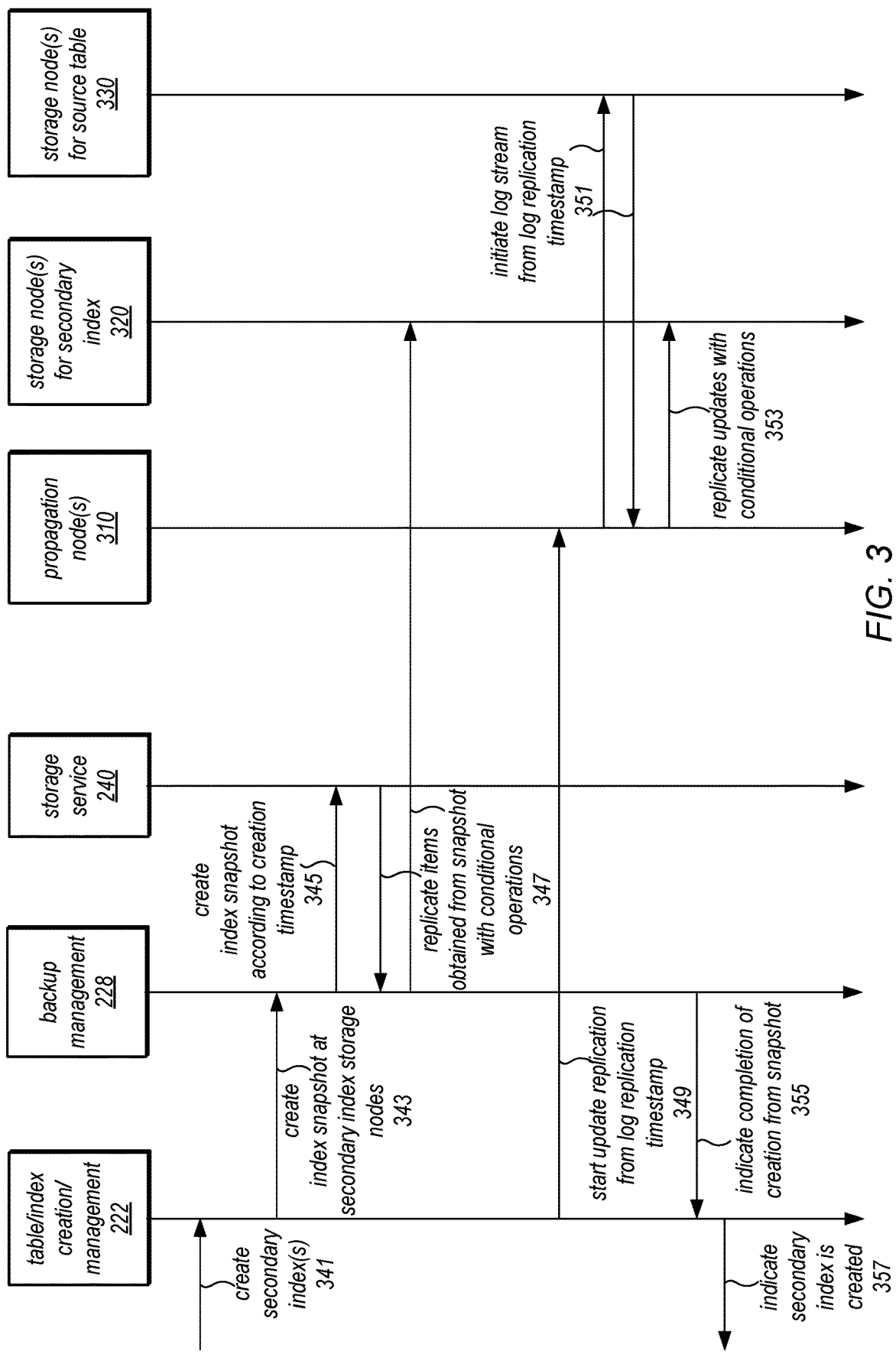
FIG. 3 is a logical block diagram illustrating interactions to perform offline index builds for database tables in a database service, according to some embodiments.

FIG. 3 is a logical block diagram illustrating interactions to perform offline index builds for database tables in a database service, according to some embodiments. Table index creation management 222 may receive are request to create a secondary index (or multiple ones) as indicated 341. Index management 222 may send a request to create an index snapshot at secondary index storage nodes 343 to backup management 228. Backup management 228 may perform an operation to create an index snapshot according to creation timestamp 345 to storage service 240. For example, a creation timestamp, as discussed below with regard to FIG. 4, may occur after timestamp ordering is enabled for a source database table. In some embodiments, creation of the snapshot may include taking an already created snapshot and applying a log of updates also stored in storage service 240 (as discussed above) to bring the snapshot up to a state consistent with creation timestamp. In some embodiments, backup management 228 may create the index snapshot by applying the schema when creating the snapshot (e.g., arranging, excluding, or other operations as specified by the schema) so that the created index snapshot is a version of the secondary index consistent with the creation timestamp. In other embodiments, as noted below, backup management 228 may evaluate a created index snapshot to then determine what items to replicate.

Backup management 228 may then replicate items obtained from the snapshot using conditional operations 347 to storage nodes for secondary index 320 that satisfy a schema for the secondary index. For example, backup management 228 may scan the created snapshot and evaluate each item with respect to the schema by issuing reads, scans, queries, or other various other access requests with respect to the items of the snapshot in storage service 240. Storage node(s) for secondary index 320 may be assigned to the secondary index by table/index creation/management 222 (not illustrated), in some embodiments.

Index creation management may start replication from log replication timestamp 349 to propagators 310. As discussed below with regard to FIG. 4, log replication timestamp may occur (in time) before the creation timestamp to create an overlap for the updates replicated from the update log and the version of the source database table in the created index snapshot. Propagators 310 may initiate a log stream from the log replication timestamp 351 from storage nodes 330 for the source table (which may send updates as a stream of log records). For example, storage nodes for source table 330 may determine what updates in an update log occur on or after the log replication timestamp and send them to propagation node(s) 310. Propagators 310 may replicate updates from with conditional operations 353 to storage nodes 320 that satisfy the schema for the secondary index. Some updates in the log stream, for instance, may not be specified for inclusion in the secondary index according to the schema and thus may be ignored or dropped.

Backup management 228 may provide an indication of completion from the snapshot 355 to table/index creation/management 222, in various embodiments. For example, backup management 228 may determine that no more items are to be replicated from the snapshot and in response send completion of the creation of the secondary index from snapshot. Table/index creation/management 222 may provide an indication that the secondary index is created 357 to a client in response to the creation from snapshot 355, in some embodiments.

Figure 4:
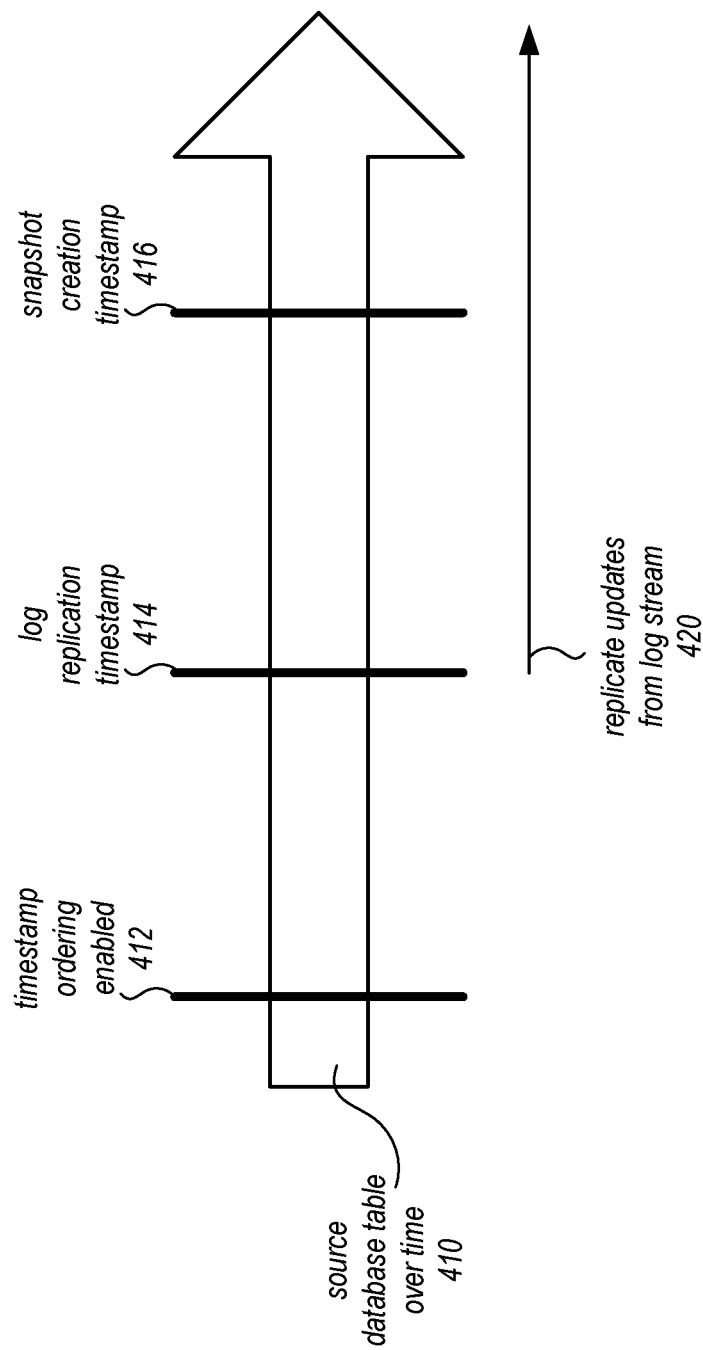
FIG. 4 is a logical block diagram illustrating a timeline of timestamps for performing offline index builds for database tables, according to some embodiments.

FIG. 4 is a logical block diagram illustrating a timeline of timestamps for performing offline index builds for database tables, according to some embodiments. A source database table may be updated over time, as indicated 410. In order to ensure that all updates are replicated to a secondary index using a snapshot, different timestamps may be used to create an overlap that may prevent an in-flight update from being left out of a secondary index. For example, timestamp ordering may be enabled at time 412. This may occur when the source database table is created, when the secondary index is created, or in response to some other request to enable timestamp ordering. Prior to timestamp ordering enabled 412, updates may be received without an assigned timestamp such that version comparisons could not be performed, in some embodiments. Snapshot creation timestamp may be at 416. Snapshot creation timestamp 416 may be associated with a time that a secondary index creation request is received, in various embodiments. Log replication timestamp may be at 414. In various embodiments, log replication timestamp 414 may be determined (e.g., by table/index creation/management 222) to provide a minimum amount of overlap (e.g., 10 seconds, 1 hour, etc.) in time so that replication of updates from the log stream may occur from 420 onwards should also be included in the snapshot created according to snapshot creation timestamp 416.

Figure 5:
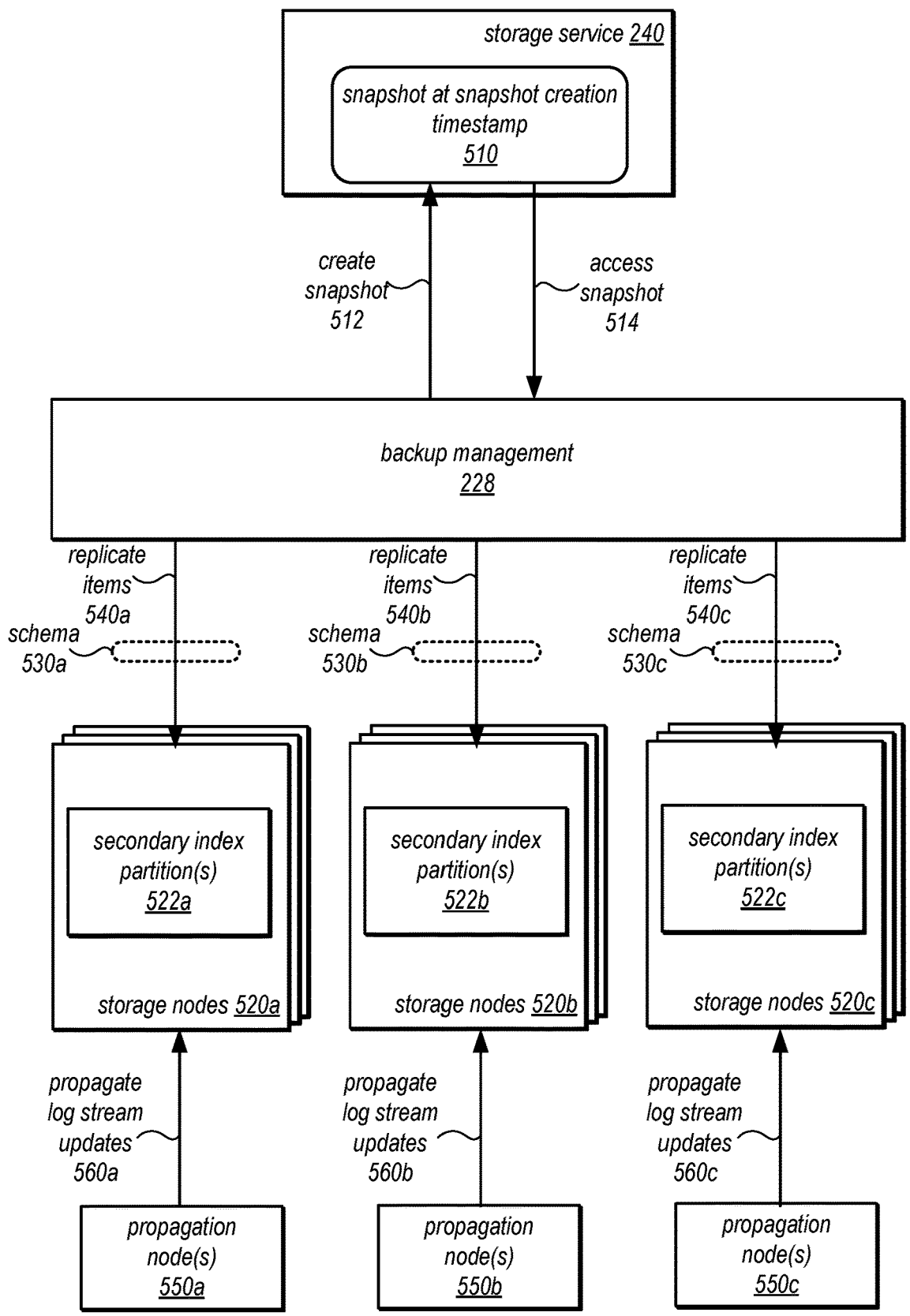
FIG. 5 is a logical block diagram illustrating example interactions to create multiple secondary indexes offline and in parallel, according to some embodiments.

FIG. 5 is a logical block diagram illustrating example interactions to create multiple secondary indexes offline and in parallel, according to some embodiments. Backup management 228 may create a snapshot at snapshot creation timestamp 510 in storage service 240, as discussed above. In some embodiments, this snapshot may not be specific to storing the items of any one secondary index, but instead may be a snapshot of an entire source database table (or partition of a database table). Backup management 228 may access the timestamp to replicate 540 items to their different storage nodes to create different secondary indexes 522 according to different schemas in parallel. For example, Backup management 228 may replicate items 540a (e.g., by location attribute) according to schema 530a (e.g., which specifies the location attribute) to storage nodes 520a to store as part of partition(s) 522a for the secondary index. Whereas backup management 228 may replicate items 540b (e.g., by category attribute) according to schema 530a (e.g., which specifies the category attribute) to storage nodes 520b to store as part of partition(s) 522b for the secondary index and backup management 228 may replicate items 540c (e.g., ordered by date attribute instead of user identifier) according to schema 530c (e.g., which specifies the ordering by date attribute) to storage nodes 520c to store as part of partition(s) 522c for the secondary index. In this way, a single snapshot 510 can be used to create multiple secondary indexes.

Propagation nodes, such as propagation nodes 550a, 550b, and 550c, may respectively propagate log stream updates 560a, 560b, and 560c to update (conditionally as described above with regard to FIG. 3) secondary index partition(s) 522a, 522b, and 522c respectively. In some embodiments, a single propagation node may be assigned to a source table (or source partition of a table) and may perform the propagation of log stream updates 560 to each of the different secondary index partition(s) 522a, 522b, and 522c (not illustrated). In at least some embodiments, a metric or other indicator of the progress of a secondary index offline build may be provided to a user via metrics collection/monitoring service of a provider network 200 or via an interface for database service 210 (e.g., by table/index creation/management 222). For example, the number of partitions to fill in the secondary index, as represented by K, may be used to determine this metric by calculating the amount of data, K*10 partition amount (e.g., 10 GB), the speed at which partitions can be filled, K*write bandwidth (e.g., 1,000 KB/s), to determine the total time, data divided by speed. In some embodiments, the progress metric may be determined from an amount of time elapsed relative to the estimated total time.

Figure 6:
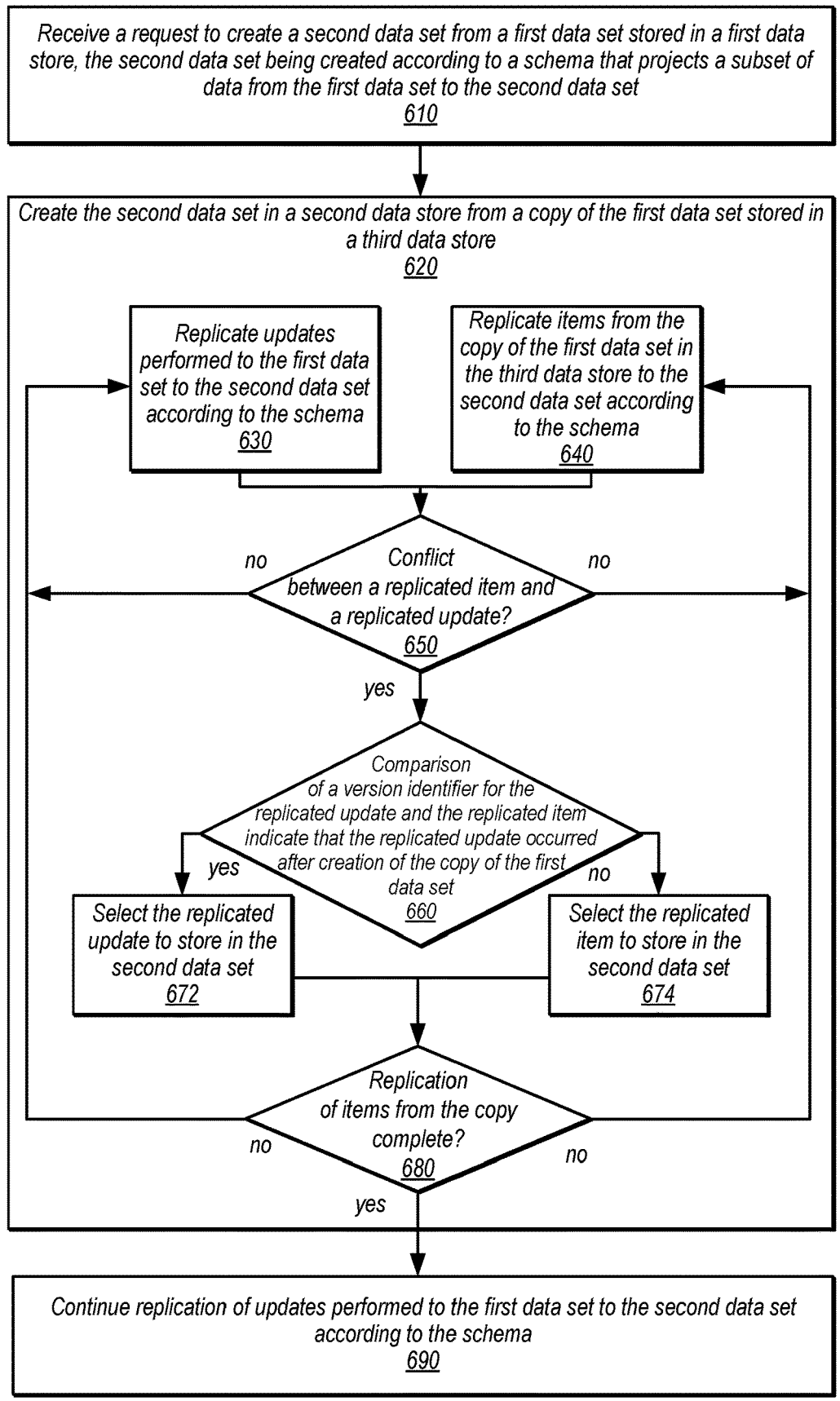
FIG. 6 is a high-level flowchart illustrating various methods and techniques to implement offline builds for projected data subsets, according to some embodiments.

The examples of a database that implements offline index builds for database tables as discussed in FIGS. 2-5 above have been given in regard to a database service (e.g., relational database, document database, non-relational database, etc.). However, various other types of database systems or storage systems can advantageously implement offline builds for projected data subsets, in other embodiments. FIG. 6 is a high-level flowchart illustrating various methods and techniques to implement offline builds for projected data subsets, according to some embodiments. These techniques, as well as the techniques discussed with regard to FIG. 7, may be implemented using components or systems as described above with regard to FIGS. 2-5, as well as other types of databases or storage systems, and thus the following discussion is not intended to be limiting as to the other types of systems that may implement the described techniques.

As indicated at 610, a request may be received to create a second data set from a first data set stored in a first data store, the second data set being created according to as schema that projects a subset of data from the first data set to the second data set, in some embodiments. For example, as discussed above with regard to FIG. 1, a schema for a projected data subset may provide a different arrangement or other ordering of items stored in a source data set, such as a secondary index discussed above. In some embodiments, the same number of items may be replicated, but only a subset of attributes may be replicated according to the schema (e.g., a source table with 5 columns may be replicated to a projected data subset that only includes 2 columns). The request may be formatted according to an interface for the first data store (e.g., an API, command line interface, GUI, etc.) and may specify or identify the schema as well as the source data set, the first data set. In some embodiments, the destination for the replicated data subset, the third data store may be specified as part of the request and/or the second data store (e.g., the data storage service or other data store separate from the first data store) that stores the copy of the first data set.

As indicated at 620, the second data set maybe created from a copy of the first data set stored in a third data store, in some embodiments. For example, the copy may be created (e.g., as a snapshot) in response to the request to create the second data set, in some embodiments. In some embodiments, the copy may exist before the request to create the second data set.

The first data set may be available for updates while the second data set is being created, in various embodiments. Therefore, techniques for handling conflicts between updates that may be applicable to the second data set that are received while the second data set is being created from the copy and the copy of the first data set itself may be handled. For example, as indicated at 630, updates performed to the first data set may be replicated to the second data set according to the schema, in some embodiments. As indicated at 640, items from the copy of the first data set in the third data store may be replicated to the second data set according to the schema, as indicated at 640, in various embodiments.

If no conflict between a replicated item and replicated updates is detected, then replication may continue, as indicated at 650. For example, as discussed above, replication may involve performing conditional updates using version identifiers. If a version identifier in a conditional request does not satisfy the condition, then the request may fail. For example, as indicated at 660, a version identifier (e.g., a timestamp or other indication of ordering that versions of the item should be made visible at the second data set) for the replicated update may be compared with a version identifier for the replicated item. If the replicated update occurred after creation of the item, as indicated by the version identifier comparison, then the replicated update may be selected to store in the second data set, as indicated at 672 (e.g., as either the value to retain or to overwrite an existing value). Similarly, if the replicated update occurred before creation of the item, as indicated by the version identifier comparison, then the replicated item may be selected to store in the second data set, as indicated at 674 (e.g., as either the value to retain or to overwrite an existing value).

Replication may continue until replication of items form the copy is complete. Then, as indicated by the positive exit from 680, replication of updates alone may continue, as indicated at 690. For example, the update log stream may still be replicated by a propagation node even if no more items are replicated from a snapshot in a data storage service.

Figure 7:
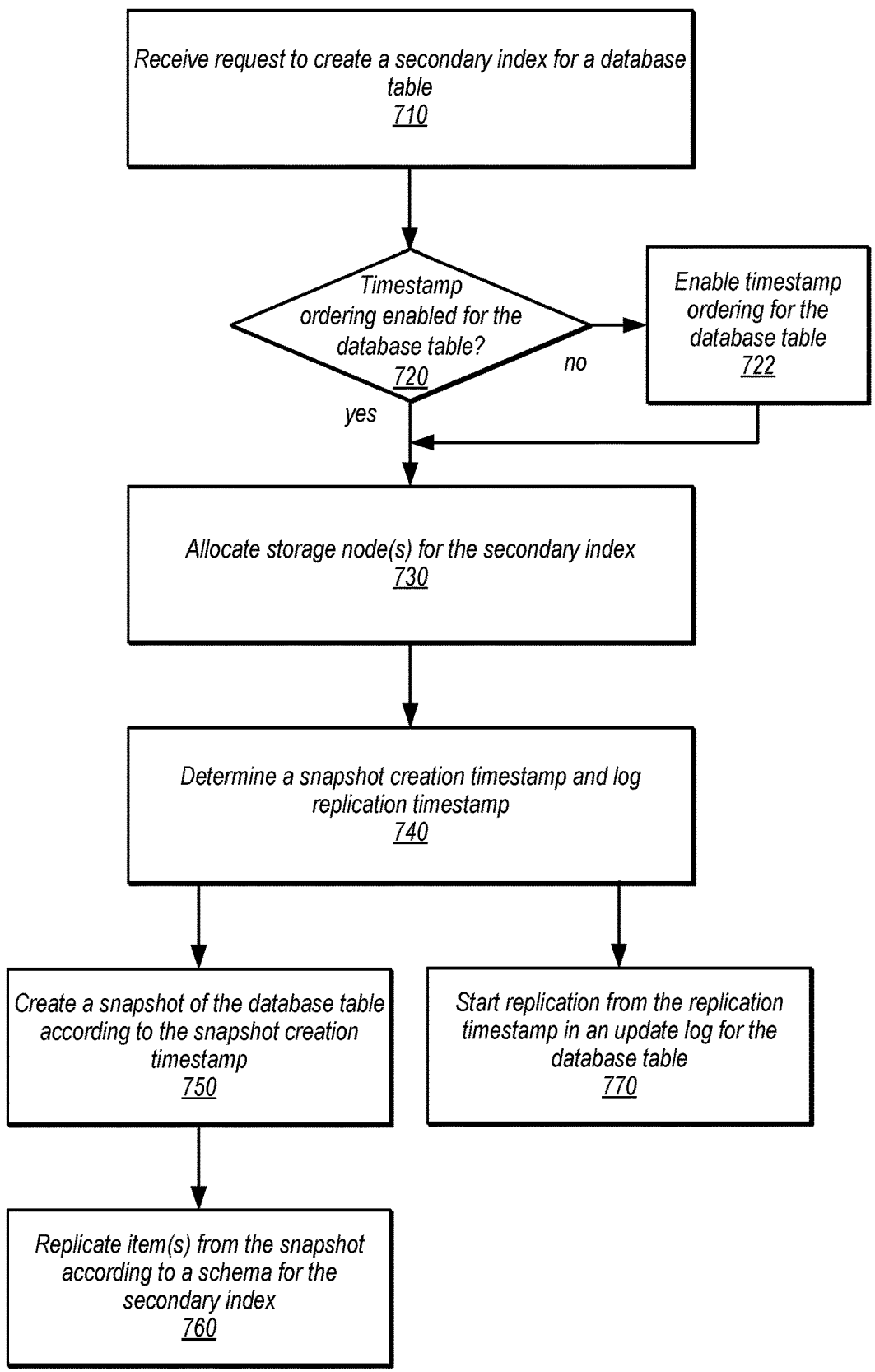
FIG. 7 is a high-level flowchart illustrating various methods and techniques to initialize propagation of updates at a new propagation node, according to some embodiments.

FIG. 7 is a high-level flowchart illustrating various methods and techniques to initialize propagation of updates at a new propagation node, according to some embodiments. As indicated at 710, a request to create a secondary index for a database table may be received, in various embodiments. As indicated at 720, a determination may be made as to whether timestamp ordering is enabled. For example, system or table configuration data may indicate whether or not timestamp ordering is enabled. If not, then timestamp ordering may be enabled for the database table, as indicated at 722, in various embodiments. For example, timestamps may begin to be assigned to updates that are received for the database table, in some embodiments.

As indicated at 730, storage node(s) for the secondary index may be allocated, in some embodiments. For example, a control plane or other component of a database system may identify storage nodes with capacity to store a partition of the secondary index to be created (e.g., either with other partitions for other tables or secondary indexes in multi-tenant fashion or as dedicated storage node for the secondary index that does not store other partitions). As indicated at 740, a snapshot creation timestamp and log replication timestamp may be determined for the secondary index, in various embodiments. For example, the creation timestamp may be a timestamp associated with the creation request of the secondary index and the replication timestamp may be a timestamp that occurs some amount of time prior to the creation timestamp (e.g., according to a specified or fixed overlap period to ensure that no inflight updates are not included in the secondary index).

As indicated at 750, a snapshot of the database table may be created according to the snapshot creation timestamp, in some embodiments. For example, as discussed above a snapshot earlier than the snapshot creation timestamp may be updated from log records of updates that occur up to the snapshot creation timestamp in order to create the snapshot. In some embodiments, the snapshot of the database table may be an entire copy of the database table or a copy formatted according to a schema for the secondary index.

As indicated at 760, item(s) from the snapshot may be replicated according to a schema for the secondary index, in some embodiments. For instance, items may be evaluated with respect to the schema and/or formatted or ordered according to the schema when replicated (e.g., sent via conditional operation requests) to the allocated storage nodes. As indicated at 770, replication from the replication timestamp may be started in an update log for the database table, in some embodiments. For example, a propagation node may send a request to storage nodes that store the database table to begin replication of the update log in streaming fashion to the propagation node starting from the replication timestamp.

The methods described herein may in various embodiments be implemented by any combination of hardware and software. For example, in some embodiments, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 8:
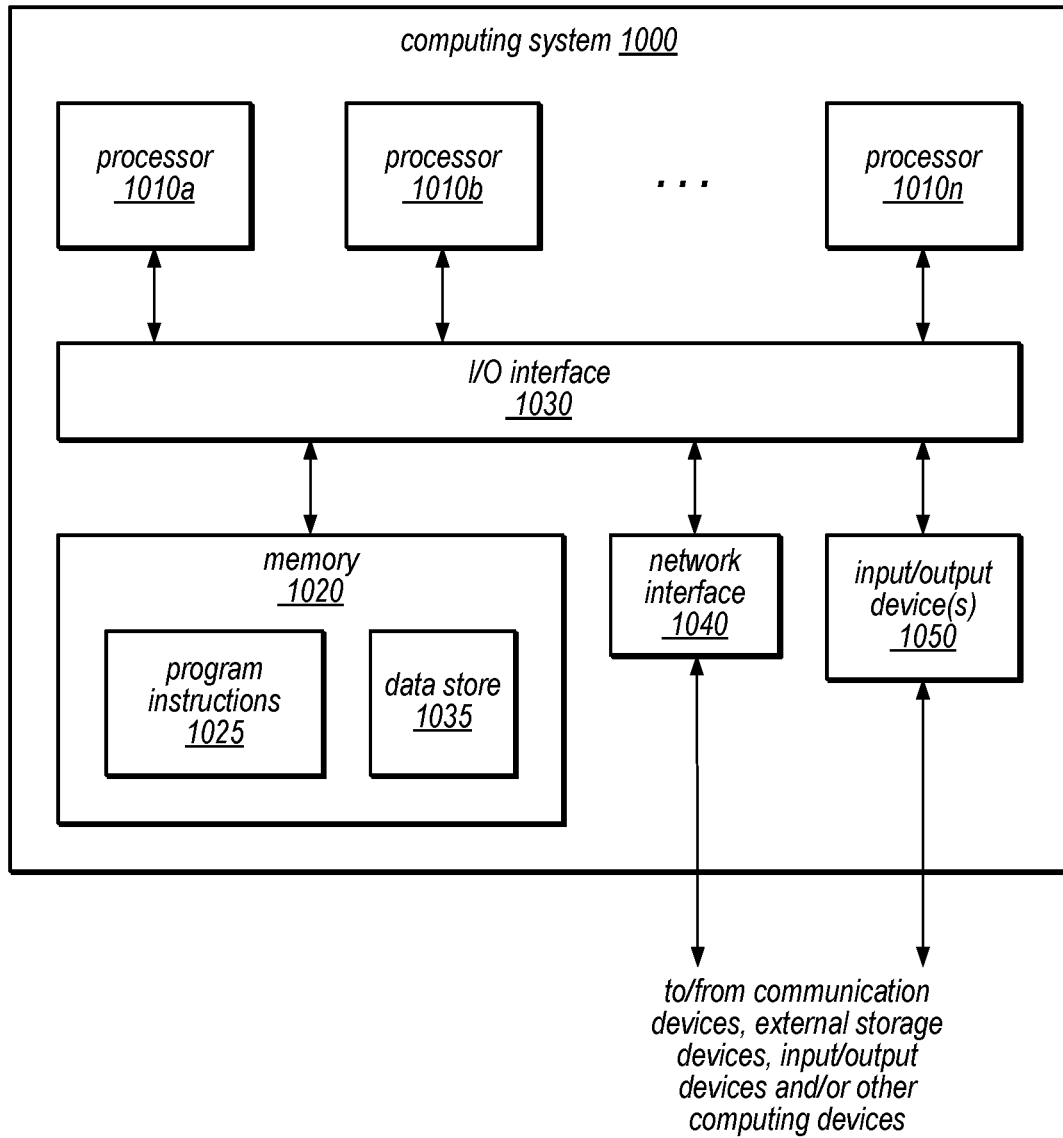
FIG. 8 is a block diagram illustrating an example computing system, according to some embodiments.

Embodiments to implement offline builds for projected data subsets as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in some embodiments. In some embodiments, it is contemplated that embodiments may be implemented using a single instance of computer system 1000, while in other embodiments multiple such systems, or multiple nodes making up computer system 1000, may host different portions or instances of embodiments. For example, in some embodiments some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in some embodiments. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in some embodiments. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in some embodiments.

System memory 1020 may store program instructions 1025 and/or data accessible by processor 1010 to implement associating a function with a table in a database system, in some embodiments. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to perform offline builds for projected data subsets are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in some embodiments.

In some embodiments, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in some embodiments. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in some embodiments. Multiple input/output devices 1050 may be present in computer system 1000 or may be distributed on various nodes of computer system 1000, in some embodiments. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various embodiments of the systems as described herein, and data store 1035, comprising various data accessible by program instructions 1025, in some embodiments. In some embodiments, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a plurality of computing devices, respectively comprising a processor and a memory, that implement a database system, wherein the database system comprises a control plane, a first one or more storage nodes that store a database table, and a second one or more storage nodes;
   wherein the control plane is configured to:
      receive a request to create a secondary index from the database table according to a schema that projects a subset of data from the database table to the secondary index, wherein the database table is able to be updated during creation of the secondary index;
      responsive to the request:
         allocate the second one or more storage nodes to store the secondary index;
         initiate replication of updates performed to the database table in the first one or more storage nodes to the secondary index in the second one or more storage nodes according to the schema;
         initiate replication of items from a snapshot created for the database table stored separate from the first one or more storage nodes to the secondary index in the second one or more storage nodes according the schema; and wherein the second one or more storage nodes are configured to select between one of the replicated updates and one of the replicated items to store in the secondary index by comparing a first version identifier for the one replicated item with a second version identifier for the one replicated update, wherein the one replicated update is selected when the first version identifier indicates that the one replicated update occurred after a creation of the snapshot of the database table.

2. The system of claim 1, wherein replication of updates performed to the database table is begun according to a timestamp that occurs before the creation of the snapshot of the database table.

3. The system of claim 1,
wherein replication of updates performed to the database table to the secondary index are performed as conditional operation requests;
wherein replication of items from the snapshot to the secondary index are performed as conditional operation requests.

4. The system of claim 1, wherein the database system is further configured to create the snapshot for the database table according to a determined snapshot creation timestamp in response to the request to create the secondary index.

5. A method, comprising:
receiving a request to create a second data set from a first data set stored in a first data store, wherein the second data set is created according to a schema specified in the request that projects a subset of data from the first data set to the second data set, wherein the first data set is able to be updated during creation of the second data set;
responsive to the request, creating the second data set in a second data store from a copy of the first data set stored in a third data store, wherein the creating comprises:
replicating updates performed to the first data set in the first data store to the second data set in the second data store according to the schema;
replicating items from the copy of the first data set in the third data store to the second data set in the second data store according the schema; and
selecting between one of the replicated updates and one of the replicated items to store in the second data set by comparing a first version identifier for the one replicated item with a second version identifier for the one replicated update, wherein the one replicated update is selected when the first version identifier indicates that the one replicated update occurred after a creation of the copy of the first data set.

6. The method of claim 5, wherein the replication of updates performed to the second data set is begun according to a timestamp that occurs before the creation of the copy of the first data set.

7. The method of claim 5, wherein replicating items from the copy of the first data set in the third data store to the second data set in the second data store comprises sending respective conditional operation requests to the second data store the items.

8. The method of claim 5, updates performed to the first data set in the first data store to the second data set in the second data store comprises sending respective conditional operation requests to the second data to perform the updates.

9. The method of claim 5, further comprising:
creating the copy of the first data set according to a determined creation timestamp in response to the request to create the second data set.

10. The method of claim 5, further comprising sending an indication that the second data is available for access when replication of the items from the copy is complete.

11. The method of claim 10, further comprising continuing replicating the updates performed to the first data set in the first data store to the second data set in the second data store according to the schema when replication of the items from the copy is complete.

12. The method of claim 5, wherein the method further comprises creating one or more other data sets according to a different respective schema from the copy of the first data set in parallel with the creating of the secondary data set.

13. The method of claim 5, wherein the first version identifier is a first timestamp and wherein the second version identifier is a second timestamp, and wherein the method further comprises enabling timestamp ordering for the first data set in response to the request to create the second data set.

14. One or more non-transitory, computer-readable storage media, storing program instructions that when executed on or across one or more computing devices cause the one or more computing devices to implement:
receiving a request to create a second data set from a first data set stored in a first data store, wherein the second data set is created according to a schema specified in the request that projects a subset of data from the first data set to the second data set, wherein the first data set is able to be updated during creation of the second data set;
responsive to the request:
allocating a second data store to store the second data set;
causing replication of updates performed to the first data set in the first data store to the second data set in the second data store according to the schema;
causing replication of items from a copy of the first data set stored in a third data store to the second data set in the second data store according the schema; and
wherein the second data store selects between one of the replicated updates and one of the replicated items to store in the second data set by comparing a first version identifier for the one replicated item with a second version identifier for the one replicated update, wherein the one replicated update is selected when the first version identifier indicates that the one replicated update occurred after a creation of the copy of the first data set.

15. The one or more non-transitory, computer-readable storage media of claim 14, wherein the replication items from the copy of the first data set in the third data store to the second data set in the second data store is performed using respective conditional operation requests to the second data store the items.

16. The one or more non-transitory, computer-readable storage media of claim 14, storing further instructions that when executed by the one or more computing devices cause the one or more computing devices to implement sending an indication that the second data is available for access when replication of the items from the copy is complete.

17. The one or more non-transitory, computer-readable storage media of claim 14, storing further instructions that when executed by the one or more computing devices cause the one or more computing devices to implement generating and providing one or more progress metrics for creating the second data set in response to a request.

18. The one or more non-transitory, computer-readable storage media of claim 14, storing further instructions that when executed by the one or more computing devices cause the one or more computing devices to implement:
   creating the copy of the first data set according to a determined creation timestamp in response to the request to create the second data set.

19. The one or more non-transitory, computer-readable storage media of claim 14, wherein the replication of updates performed to the second data set is begun according to a timestamp that occurs before the creation of the copy of the first data set.

20. The one or more non-transitory, computer-readable storage media of claim 14, wherein the one or more computing devices are implemented as part of a control plane for a database service hosted by a provider network.

* * * * *

UNITED STATES PATENT AND TRADEMARK OFFICE
CERTIFICATE OF CORRECTION

| | | |
|---|---|---|
| PATENT NO. | : 11,250,022 B1 | Page 1 of 1 |
| APPLICATION NO. | : 17/037482 | |
| DATED | : February 15, 2022 | |
| INVENTOR(S) | : Sharatkumar Nagesh Kuppahally et al. | |

It is certified that error appears in the above-identified patent and that said Letters Patent is hereby corrected as shown below:

On the Title Page

Item (72), please add as last Inventor "Sagar Mundra, San Jose, CA (US)"

Signed and Sealed this
Twenty-seventh Day of May, 2025

Coke Morgan Stewart
*Acting Director of the United States Patent and Trademark Office*